United States Patent
Nomichi et al.

(10) Patent No.: US 7,814,925 B2
(45) Date of Patent: Oct. 19, 2010

(54) RELIEF VALVE DEVICE

(75) Inventors: Kaoru Nomichi, Ono (JP); Seiji Ishii, Ono (JP); Makoto Ninomiya, Kobe (JP)

(73) Assignee: Kabushiki Kaisha Kawasaki Precision Machinery, Kobe-shi (JP)

( * ) Notice: Subject to any disclaimer, the term of this patent is extended or adjusted under 35 U.S.C. 154(b) by 541 days.

(21) Appl. No.: 11/718,974

(22) PCT Filed: Nov. 11, 2004

(86) PCT No.: PCT/JP2004/016730

§ 371 (c)(1),
(2), (4) Date: Jan. 17, 2008

(87) PCT Pub. No.: WO2006/051591

PCT Pub. Date: May 18, 2006

(65) Prior Publication Data

US 2008/0276992 A1    Nov. 13, 2008

(51) Int. Cl.
F16K 17/38    (2006.01)
F16K 17/40    (2006.01)

(52) U.S. Cl. .................... 137/72; 137/79; 220/89.4
(58) Field of Classification Search .......... 137/72, 137/79; 220/89.4
See application file for complete search history.

(56) References Cited

U.S. PATENT DOCUMENTS

| | | | | |
|---|---|---|---|---|
| 2,620,815 A | * | 12/1952 | Margraf et al. | 137/72 |
| 4,365,643 A | * | 12/1982 | Masclet et al. | 137/72 |
| 4,922,944 A | * | 5/1990 | Mueller et al. | 137/72 |
| 5,109,881 A | * | 5/1992 | Baker | 137/72 |
| 5,118,164 A | * | 6/1992 | Rossigno et al. | 137/72 |
| 5,632,297 A | * | 5/1997 | Sciullo et al. | 137/72 |

(Continued)

FOREIGN PATENT DOCUMENTS

EP    1 069 355 A2    1/2001

(Continued)

OTHER PUBLICATIONS

International Search Report for PCT/JP2004/016730, dated Feb. 4, 2005.

(Continued)

*Primary Examiner*—John Rivell
(74) *Attorney, Agent, or Firm*—Marshall, Gerstein & Borun LLP

(57) ABSTRACT

Under emergency, a valve body displaced from a closed position to an open position in association with melting of a fuse member receives resultant of pressing forces of a primary pressure of gas guided through a primary port in an opening direction in a state where the valve body is disposed at the position closer to the open position including a fluid driving start position between the closed position and the open position. The valve body receives smaller resultant of the pressing forces of the primary pressure in the opening direction in a state where the valve body is disposed at the position closer to the closed position than to the fluid driving start position than the resultant of the pressing forces received by the valve body in the state where the valve body is disposed at the position closer to the open position including the fluid driving start position.

3 Claims, 7 Drawing Sheets

U.S. PATENT DOCUMENTS

| | | | |
|---|---|---|---|
| 5,954,138 A * | 9/1999 | Gabriel | 137/72 |
| 6,367,500 B1 * | 4/2002 | Kerger et al. | 137/79 |
| 6,382,234 B1 * | 5/2002 | Birckhead et al. | 137/72 |
| 7,150,287 B2 * | 12/2006 | Kita et al. | 137/72 |

FOREIGN PATENT DOCUMENTS

| | | |
|---|---|---|
| JP | 08-233139 | 9/1996 |
| JP | 2001-317645 | 11/2001 |
| JP | 2002-168399 | 6/2002 |
| JP | 2003-247652 | 9/2003 |

OTHER PUBLICATIONS

Supplementary European Search Report for European Patent Application No. 04822391.1, dated Jun. 17, 2010.

* cited by examiner (1) PRIOR ART (2) PRIOR ART (1) PRIOR ART (2) PRIOR ART

RELIEF VALVE DEVICE

TECHNICAL FIELD

The present invention relates to a relief valve device equipped in pressure equipment such as high-pressure gas apparatuses.

BACKGROUND ART

FIG. 6 is a cross-sectional view showing a relief valve 1 according to a prior art. The relief valve 1 is equipped in a pressure vessel and used for releasing a gas from the pressure vessel in an emergency situation such as occurrence of a fire in which ambient temperature rises. The relief valve 1 is formed by providing a piston 6, a pressing spring 7 and a fuse metal 8 in the interior of a housing 5 provided with a valve passage 4 connecting a primary port 2 and a secondary port 3 to each other. The piston 6 is provided at a closed position for closing the valve passage 4 and prevented from being displaced to an open position for opening the valve passage 4 by the fuse metal 8. The piston 6 receives a pressing force in an opening direction, which is caused by the gas guided through the primary port 2 and the pressing spring 7 [FIG. 6(1)]. With such a configuration, under normal condition, the valve passage 4 is closed, while under emergency condition, the fuse metal 8 is melted and thus the piston 6 is displaced so as to open the valve passage 4, thereby outputting the gas therefrom [FIG. 6(2)].

FIG. 7 is a cross-sectional view showing a relief valve 10 according to another prior art. The relief valve 10 in FIG. 7 is similar to the relief valve 1 in FIG. 6 and therefore only differences will be described. The relief valve 10 in FIG. 7 is configured in such a manner that a pressure cancel chamber 11 is formed on the opposite side of the primary port 2 with respect to the piston 6 and a through hole 12 formed in the piston 6 connects the primary port 2 to the pressure cancel chamber 12 [FIG. 7(1)]. In this manner, the pressing force applied to the fuse metal 8 by a primary pressure p1 is cancelled. Output of the gas under emergency condition is performed in the same manner as in the relief valve 1 shown in FIG. 6 [FIG. 7(2)] (For example, see Patent document 1).

Patent document 1: Japanese Laid-Open Patent Publication No. 2001-317645

DISCLOSURE OF THE INVENTION

Problems to be Solved by the Invention

In the relief valve 1 shown in FIG. 6, the pressing force of the primary pressure p1 of the gas guided through the primary port 2 is applied to the fuse metal 8. Therefore, when the primary pressure p1 is high, a creep occurs in the fuse metal 8, resulting in deformation of the fuse metal 8. To prevent such deformation, it becomes necessary to make the fuse metal 8 larger. As a result, the relief valve 1 itself also becomes larger.

The relief valve 10 disclosed in the Patent document 1 in FIG. 7 is able to cancel the pressing force of the primary pressure p1 applied to the fuse metal 8, which is a problem associated with the relief valve 1 in FIG. 6. However, the relief valve 10 is unable to use the pressing force of the primary pressure to drive the piston 6 and thus, the piston 6 must be driven only by the pressing force applied by the pressing spring 7 at all times. Accordingly, the large-sized pressing spring 7 is required and the relief valve 10 itself becomes larger. Especially when the primary pressure p1 is high, a seal structure provided to prevent leakage of the gas under normal condition causes a large sliding resistance to piston driving under emergency condition and the extremely large pressing spring 7 is needed. Furthermore, with the configuration to drive the piston 6 only by the pressing spring 7, the valve passage 4 cannot be quickly opened under emergency condition, differently from the case of utilizing the primary pressure p1.

Means for Solving the Problem

An object of the present invention is to provide a compact relief valve device capable of suppressing a pressing force applied to a displacement preventing means for preventing the opening operation under normal condition and of achieving a quick opening operation under emergency condition.

According to the present invention, there is provided a relief valve device comprising a housing provided with a valve passage through which a primary port and a secondary port are connected to each other; a valve body which is disposed at a closed position where the valve passage is closed and is displaceable in an opening direction toward an open position where the valve passage is opened, the valve body being provided so as to receive resultant of pressing forces of a primary pressure of fluid guided through the primary port in the opening direction in a state where the valve body is disposed at a position closer to the open position including a fluid driving start position between the closed position and the open position, and so as to receive smaller resultant of the pressing forces of the primary pressure in the opening direction in a state where the valve body is disposed at a position closer to the closed position than to the fluid driving start position than the resultant of the pressing forces received by the valve body in the state where the valve body is disposed at the position closer to the open position including the fluid driving start position; a pressing means for pressing the valve body in the opening direction; and a displacement preventing means which is made of a material melted when its temperature reaches a predetermined melting point or higher, the displacement preventing means being provided in a space opened to an outside space and supporting the valve body disposed at the closed position to prevent displacement of the valve body in the opening direction.

According to the present invention under normal condition, the valve body which is displaceable from the closed position to the open position is disposed at the closed position, is supported by the displacement preventing means and prevented from being displaced in the opening direction. In this state, the valve passage is closed, thereby preventing flow of the fluid from the primary port to the secondary port. Under emergency condition such as occurrence of a fire, when the ambient temperature rises to the melting point of the displacement preventing means or higher, the displacement preventing means is melted and the valve body is pressed by the pressing means and displaced in the opening direction. As a result, the valve passage is opened, thereby allowing the flow of fluid from the primary port to the secondary port.

In the state where the valve body displaced under emergency condition is disposed at the closed position, the pressing force of the primary pressure received by the valve body is small. When the valve body is displaced from the closed position to the fluid driving start position, the pressing force of the primary pressure received by the valve body becomes larger. Thus, by making the pressing force applied to the displacement preventing means via the valve body smaller under normal condition, deformation of the displacement preventing means can be prevented. Under emergency condition, when the valve body is pressed by the pressing force of the pressing means so as to be displaced to the fluid driving start position, the valve body can be displaced in the opening direction with a large pressing force obtained by adding the pressing force of primary pressure to the pressing force of the pressing means.

According to the present invention, in the state where the valve body is disposed at the position closer to the closed position than to the fluid driving start position, the resultant of the pressing forces of the primary pressure received by the valve body becomes zero.

According to the present invention, in the state where the valve body is disposed at the position closer to the closed position than to the fluid driving start position, the pressing forces of the primary pressure received by the valve body are in balance. Thus, it is possible to prevent the pressing force of the primary pressure from being applied to the displacement preventing means via the valve body under normal condition.

Furthermore, according to the present invention, in the relief valve device, a pressure chamber is formed by the valve body and the housing such that the pressure chamber is disconnected from the primary port in the state where the valve body is disposed at the position closer to the open position including the fluid driving start position, and is connected to the primary port in the state where the valve body is disposed at the position closer to the closed position than to the fluid driving start position, the valve body receives a pressing force in the opening direction from fluid in the pressure chamber, the housing is provided with a pressure control passage through which the pressure chamber is connected to the outside space, and a check valve means is provided in the pressure control passage, for allowing flow of fluid flowing from the outside space toward the pressure chamber and for preventing flow of fluid flowing from the pressure chamber toward the outside space.

According to the present invention, the pressure chamber which is disconnected from the primary port in the state where the valve body is disposed at the position closer to the open position including the fluid driving start position, and which is connected to the primary port in the state where the valve body is disposed at the position closer to the open position than to the fluid driving start position is formed. The pressure chamber is connected to the outside space through the pressure control passage. The check valve means is provided in the pressure control passage and serves to allow the flow of fluid flowing from the outside space toward the pressure chamber and to prevent the flow of fluid flowing from the pressure chamber toward the outside space. When the valve body is displaced from the open position to the fluid driving start position, generation of the negative pressure in the pressure chamber can be prevented by flowing the fluid from the outside space through the pressure control passage. Thus, the valve body can be smoothly displaced. When the valve body is displaced to the fluid driving start position and the primary pressure is guided to the pressure chamber, it is possible to prevent the fluid from flowing out from the pressure chamber to the outside space through the pressure control passage and to thus press the valve body with the pressing force of the primary pressure.

EFFECTS OF THE INVENTION

According to the present invention, the pressing force applied to the displacement preventing means can be made smaller under normal condition so that deformation of the displacement preventing means can be prevented, and its size does not increase. In addition, under emergency condition, after the valve body is displaced to the fluid driving start position, the valve body can be quickly displaced with a large pressing force obtained by adding the pressing force of primary pressure and thus, the quick opening operation can be achieved in a short time. Furthermore, since the pressing force of the primary pressure can be utilized to drive the valve body, only the pressing force sufficient to displace the valve body to the fluid driving start position is needed in the pressing means and thus, the pressing means can be small-sized. As described above, the compact relief valve device capable of suppressing the pressing force applied to the displacement preventing means for preventing the opening operation under normal condition and of achieving the quick opening operation under emergency condition can be realized.

According to the present invention, it is possible to prevent the pressing force of the primary pressure from being applied to the displacement preventing means via the valve body under normal condition, thereby reliably preventing deformation of the displacement preventing means.

Moreover, according to the present invention, the pressure chamber connected to the outside space through the pressure control passage provided with the check valve means is formed. When the valve body is displaced to the fluid driving start position, the primary pressure is guided to the pressure chamber and the valve body is displaced by the pressing force of the primary pressure. In this manner, the relief valve device capable of changing the pressing force of the primary pressure received by the valve body between the state where the valve body is displaced toward the fluid driving start position and the state where the valve body reaches a reference position can be realized.

DESCRIPTION OF THE REFERENCE NUMERALS

Figure 1:
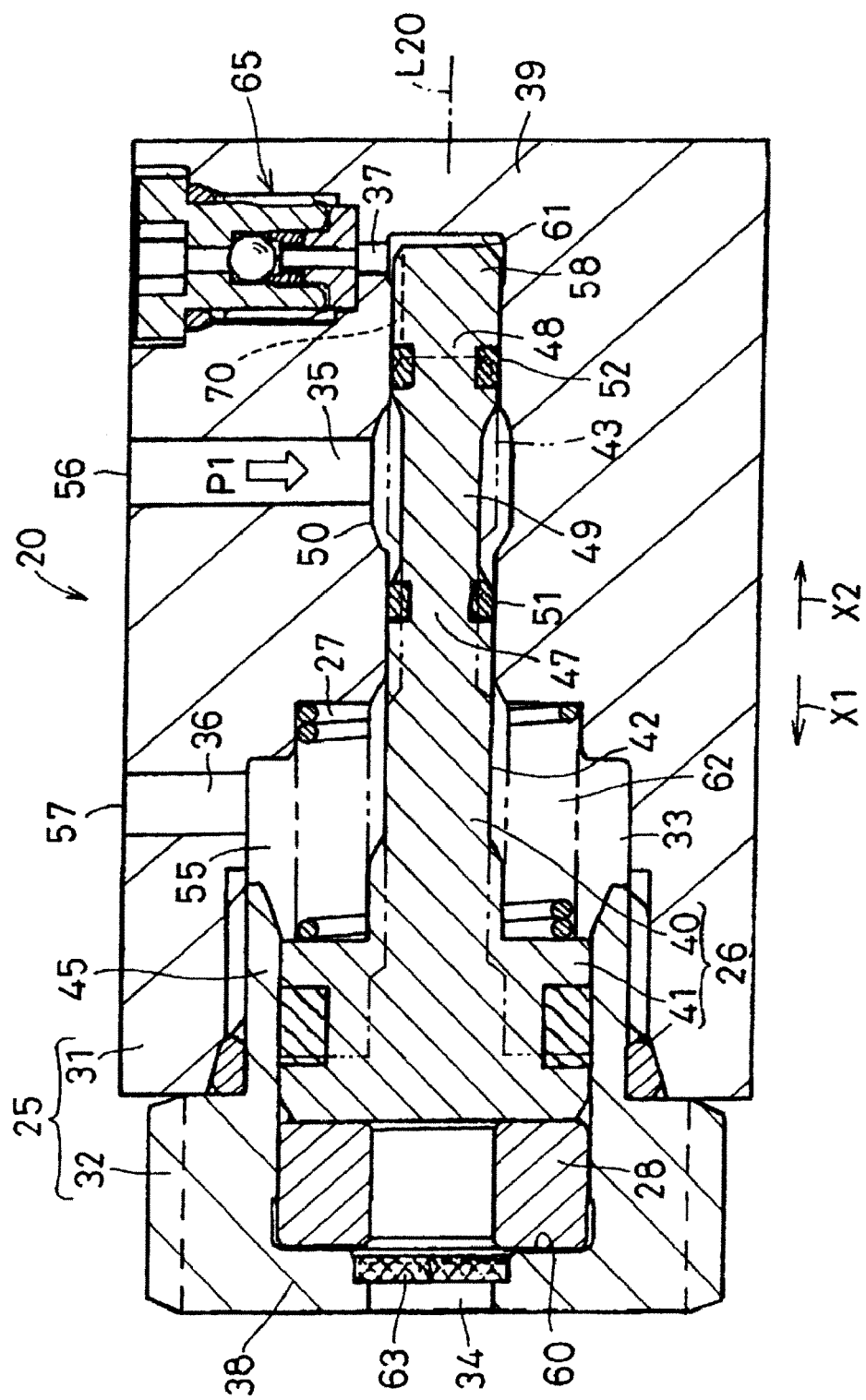
FIG. 1 is a cross-sectional view showing a relief valve device according to an embodiment of the present invention.

20, 20A, 20B relief valve
25 housing
26 valve body
27 spring member 28 fuse member
47 first opening and closing control portion
48 second opening and closing control portion
51 first rod guide portion
52 second rod guide portion
55 valve passage
56 primary port
57 secondary port
61 drive pressure chamber
65 check valve means

BEST MODE FOR CARRYING OUT THE INVENTION

Figure 2:
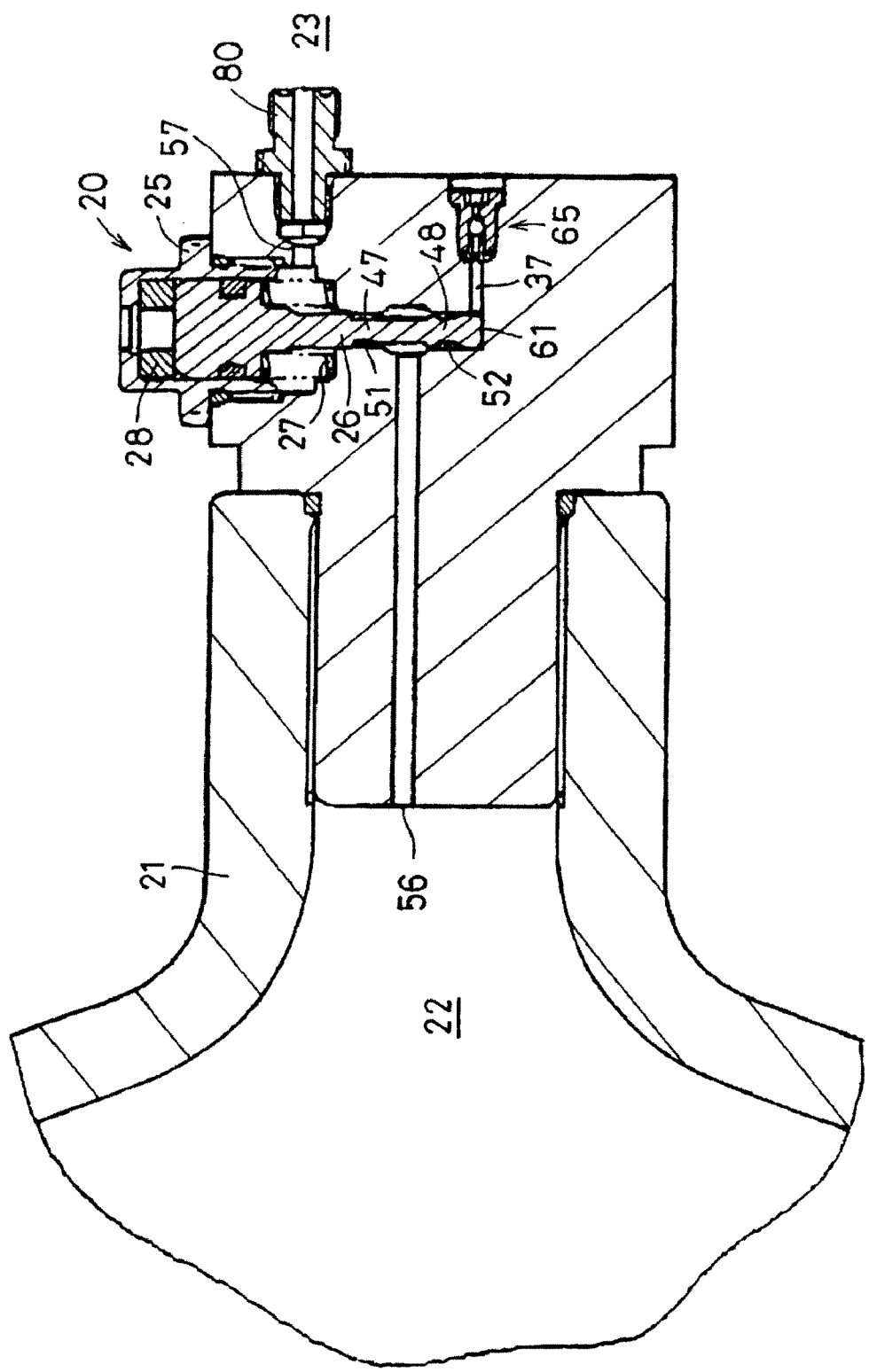
FIG. 2 is a cross-sectional view showing a state where the relief valve device in FIG. 1 is attached to a high-pressure gas tank.

FIG. 1 is a cross-sectional view showing a relief valve 20 according to an embodiment of the present invention. FIG. 2 is a cross-sectional view showing a specific use state where the relief valve 20 is attached to a high-pressure gas tank 21. A housing 25 is illustrated in a simplified manner in FIG. 1, and illustrated in FIG. 2 in a shape suitable for attachment to the high-pressure gas tank 21 to which the relief valve 20 is attached.

The relief valve 20 is a relief valve device provided at pressure equipment which deals with gas as a fluid. The pressure equipment is, for example, a pressure vessel, more specifically, the high-pressure gas tank (hereinafter referred to as a "tank") 21. Especially, the relief valve 20 is suitably used with the tank 21 for storing inflammable gas therein, such as a fuel tank for natural gas automobile. The relief valve 20 prevents output of the gas from a higher-pressure space 22 within the tank 21 (hereinafter referred to a "tank internal space") to a lower-pressure space 23 outside of the tank 21 (hereinafter referred to a "tank external space") under normal condition and allows output of the gas from the tank internal space 22 to the tank external space 23 for the purpose of safety under emergency condition such as occurrence of a fire in which ambient temperature rises. For this reason, the relief valve 20 is also called a fusible plug valve.

The relief valve 20 includes the housing 25, a valve body 26 which is a valve body, a spring member 27 which is a pressing means and a fuse member 28 which is a displacement preventing means. The housing 25 is formed by attaching a lid member 32 to a main body 31 and has a valve chamber space 33 extending along a predetermined reference axis L20. The valve chamber space 33 accommodates the piston valve body 26, the spring member 27 and the fuse member 28 therein to thereby form the relief valve 20.

In the housing 25, a melted material output passage 34 is formed at an end portion 38 (hereinafter referred to as an "first end portion") on the X1 side of directions X1 and X2 (hereinafter referred to as "axial directions") parallel to the reference axis L20 so as to extend in the axial directions X1 and X2. In the housing 25, a primary passage 35, a secondary passage 36 and a pressure control passage 37 are each formed so as to extend in the direction crossing the reference axis L20.

The primary passage 35, the secondary passage 36 and the pressure control passage 37 are located closer to an end portion 39 (hereinafter referred to as an "second end portion") on the X2 side of the axial directions X1 and X2 than the melted material output passage 34 in the axial directions X1 and X2. The secondary passage 36, the primary passage 35 and the pressure control passage 37 are arranged in this order in the direction from the first end portion 38 to the second end portion 39. The positions of these passages 36, 35, and 37 in the circumferential direction around the reference axis L20 may correspond with each other or may be shifted from each other.

The valve chamber space 33 is connected to an outside space of the housing 25 through the passages 34 to 37 formed in the housing 25. Specifically, the valve chamber space 33 is connected to the tank internal space 22 through the primary passage 35 and to the tank external space 23 through the melted material output passage 34, the secondary passage 36 and the pressure control passage 37.

The piston valve body (hereinafter referred to as "valve body") 26 includes a bar-like rod 40 and a piston 41 which is integral with a first end portion of the rod 40 and has an outer diameter larger than the rod 40. The valve body 26 is provided in the valve chamber space 33 in such a manner that its axis corresponds with the reference axis L20 and the piston 41 is disposed on the X1 side of the axial directions.

The valve body 26 is displaceable between a closed position 42 represented by a solid line in FIG. 1 and an open position 43 represented by a virtual line in FIG. 1, at least from the closed position 42 toward the open position 43 in the opening direction X1. In this embodiment, the valve body 26 is also displaceable from the open position 43 toward the closed position 42 in the closing direction X2. Since the opening direction is a first direction of the axial directions and the closing direction is a second direction of the axial directions, they are identified by the same reference numbers.

The housing 25 has a piston guide portion 45 located on the X1 side relative to the secondary passage 36 in the axial directions X1 and X2 and the piston 41 of the valve body 26 is provided to be fitted into the piston guide portion 45. The piston guide portion 45 has an inner diameter equal in the axial directions X1 and X2. Whether the valve body 26 is located at the closed position 42, the open position 43 or any transitional position between the positions 42 and 43, the outer peripheral portion of the piston 41 is in close contact with the inner peripheral portion of the piston guide portion 45. Thereby, the primary passage 35, the secondary passage 36 and the pressure control passage 37 are tightly separated and disconnected from the melted material output passage 34.

First and second opening and closing control portions 47 and 48 are formed in the rod 40 of the valve body 26 so as to be spaced apart from each other in the axial directions X1 and X2. A rod-side retreat portion 49 is formed between the opening and closing control portions 47 and 48. The first opening and closing control portion 47 is located closer to the piston 41 than the second opening and closing control portion 48. The opening and closing control portions 47 and 48 have an equal outer diameter and the rod-side retreat portion 49 has a smaller outer diameter than the opening and closing control portions 47 and 48.

In the housing 25, a first rod guide portion 51 is formed between the primary passage 35 and the secondary passage 36, and a second rod guide portion 52 is formed between the primary passage 35 and the pressure control passage 37 in the axial directions X1 and X2. The rod guide portions 51 and 52 are the same and have an equal inner diameter in the axial directions X1 and X2.

A housing-side retreat portion 50 which has a larger inner diameter than the first and second rod guide portions 51 and 52 is formed between the first and second rod guide portions 51 and 52 of the housing 25. The primary passage 35 is opened in the valve chamber space 33 at the housing-side retreat portion 50. The portion of the housing 25 between the first rod guide portion 51 and the piston guide portion 45 is retreated so as to have a larger inner diameter than the first rod guide portion 51.

In the state where the first opening and closing control portion 47 of the valve body 26 is fitted into the first rod guide portion 51 of the housing 25, the outer peripheral portion of the first opening and closing control portion 47 is in close contact with the inner peripheral portion of the first rod guide portion 51. Thereby, the portion of the valve chamber space 33 between the primary passage 35 and the secondary passage 36 is tightly separated and closed. In the state where the first opening and closing control portion 47 is unfitted with respect to the first rod guide portion 51, the portion of the valve chamber space 33 between the primary passage 35 and the secondary passage 36 is opened.

In the state where the second opening and closing control portion 48 of the valve body 26 is fitted into the second rod guide portion 52 of the housing 25, the outer peripheral portion of the second opening and closing control portion 48 is in close contact with the inner peripheral portion of the second rod guide portion 52. Thereby, the portion of the valve chamber space 33 between the primary passage 35 and the secondary passage 36 is tightly separated and closed. A gap is formed in a portion of the rod 40 on the X2 side in the axial directions relative to the second opening and closing control portion 48 in the state where the second opening and closing control portion 48 is fitted into the second rod guide portion 52. In the state where the second opening and closing control portion 48 is unfitted with respect to the second rod guide portion 52, the portion of the valve chamber space 33 between the primary passage 35 and the pressure control passage 37 is opened.

In the state where the valve body 26 is provided to the housing 25, the housing 25 and the valve body 26 cooperate to form a valve passage 55, a fuse member chamber 60, a driving pressure chamber 61 and a spring chamber 62. Specifically, by partitioning the valve chamber space 33 by the piston 41, the portion of the valve chamber space 33 that is located on the X1 in the axial directions side relative to the piston 41 forms the fuse member chamber 60. In the portion of the valve chamber space 33 that is located on the X2 side in the axial directions relative to the piston 41, the region surrounded by the second rod guide portion 52 and the region on the X2 side in the axial directions relative to the former region form the driving pressure chamber 61. An end portion 58 of the rod 40 on the X2 side in the axial directions faces the driving pressure chamber 61.

In the portion of the valve chamber space 33 that is located on the X2 side in the axial directions relative to the piston 41, a remaining portion other than the driving pressure chamber 61 forms a passage portion. The passage portion, the primary passage 35 and the secondary passage 36 form the valve passage 55. The primary port 56 is an opening at the end portion of the primary passage 35 which is located on the opposite side of the valve chamber space 33. The secondary port 57 is an opening at the end portion of the secondary passage 36 which is located on the opposite side of the valve chamber space 33. The spring chamber 62 is formed by a part of the valve chamber space 33 which forms the valve passage 55 and is located between the piston 41 and the second rod guide portion 51 in the axial directions X1 and X2. That is, the valve passage 55 includes the spring chamber 62.

In the state where the valve body 26 is disposed at the closed position 42, the first opening and closing control portion 47 is fitted into the first rod guide portion 51 and the second opening and closing control portion 48 is fitted into the second rod guide portion 52. In this state, the portion of the valve chamber space 33 between the primary passage 35 and the secondary passage 36 is closed. That is, the valve passage 55 is closed and the primary port 56 and the secondary port 57 are disconnected from each other. Also, the portion of the valve chamber space 33 between the primary passage 35 and the pressure control passage 37 is closed, and the driving pressure chamber 61 is disconnected from the primary port 56.

In the state where the valve body 26 is disposed at the open position 43, the first opening and closing control portion 47 is unfitted with respect to the first rod guide portion 51 and the second opening and closing control portion 48 is unfitted with respect to the second rod guide portion 52. In this state, the portion of the valve chamber space 33 between the primary passage 35 and the secondary passage 36 is opened. That is, the valve passage 55 is opened and the primary port 56 and the secondary port 57 are connected to each other. Also, the portion of the chamber space 33 between the primary passage 35 and the pressure control passage 37 is opened, and the driving pressure chamber 61 is connected to the primary port 56.

A transitional position between the closed position 42 and the open position 43 includes a fluid driving start position and an opening start position. The opening start position is located closer to the open position than to the fluid driving start position.

At the fluid driving start position, when the valve body 26 is displaced from the closed position 42 toward the open position 43, the state where the driving pressure chamber 61 and the primary port 56 are disconnected from each other is switched to the state where the driving pressure chamber 61 and the primary port 56 are connected to each other. In the state where the valve body 26 is disposed at the position closer to the closed position than to the fluid driving start position, the driving pressure chamber 61 and the primary port 56 are disconnected from each other. In the state where the valve body 26 is disposed at the position closer to the open position including the fluid driving start position, the driving pressure chamber 61 and the primary port 56 are connected to each other.

At the opening start position, when the valve body 26 is displaced from the closed position 42 toward the open position 43, the state where the primary port 56 and the secondary port 57 are disconnected from each other is switched to the state where the primary port 56 and the secondary port 57 are connected to each other. In the state where the valve body 26 is disposed at the position closer to the closed position than to the opening start position, the primary port 56 and the secondary port 57 are disconnected from each other. On the other hand, in the state where the valve body 26 is disposed at the position closer to the open position including the opening start position, the primary port 56 and the secondary port 57 are connected to each other.

The spring member 27 is a compressive coil spring and provided in the spring chamber 62 so as to be externally fitted to the rod 40 of the valve body 26. A first end portion of the spring member 27 is supported by a portion of the second rod guide portion 51 of the housing 25 that is located on the X1 side in the axial directions and a second end portion thereof is supported by the piston 41 of the valve body 26, thereby applying a spring force to elastically press the valve body 26 in the opening direction X1 of the axial directions.

The fuse member 28 is a short cylindrical member having a through hole and is provided in the fuse member chamber 60. The fuse member 28 is disposed such that its axis corresponds with the reference axis L20. A first end portion of the fuse member 28 is in contact with the piston 41 of the valve body 26 and a second end portion thereof is in contact with a first end portion of the housing 25 in the axial directions. Thereby, the fuse member 28 supports the valve body 26 disposed at the closed position 42 from the downstream side in the opening direction X1, thereby preventing displacement the valve body 26 in the opening direction X1.

The fuse member 28 is made of a material having a temperature characteristic of melting at a melting point lower than a temperature that the ambient temperature of the relief valve 20 is expected to reach under emergency condition such as occurrence of a fire, for example, a low-melting alloy such as lead alloy. When being made of the low-melting alloy, the fuse member 28 is called a fuse metal.

The fuse member chamber 60 is opened in the tank external space 23 which is the outside space of the housing 25 through the melted material output passage 34 in which a filter 63 for reducing flow rate is provided. The fuse member 28 is melted when the ambient temperature reaches the melting point or higher. A melted material generated by melting the fuse member 28 can be output to the outside through the melted material output passage 34. The filter 63 for reducing flow rate is provided in the fused material output passage 34, thereby preventing the melted material from being output at high speed. Since the fuse member 28 is cylindrical and the through hole faces the melted material output passage 34, the melted material is smoothly output.

A check valve means 65 is provided in the pressure control passage 37. The check valve means 65 allows the flow of the fluid flowing from the tank external space 23 which is the outside space toward the driving pressure chamber 61, here, ambient gas in the tank external space 23, and prevents the flow of the fluid flowing from the driving pressure chamber toward the tank external space 23, here, gas in the driving pressure chamber 61.

Figure 3:
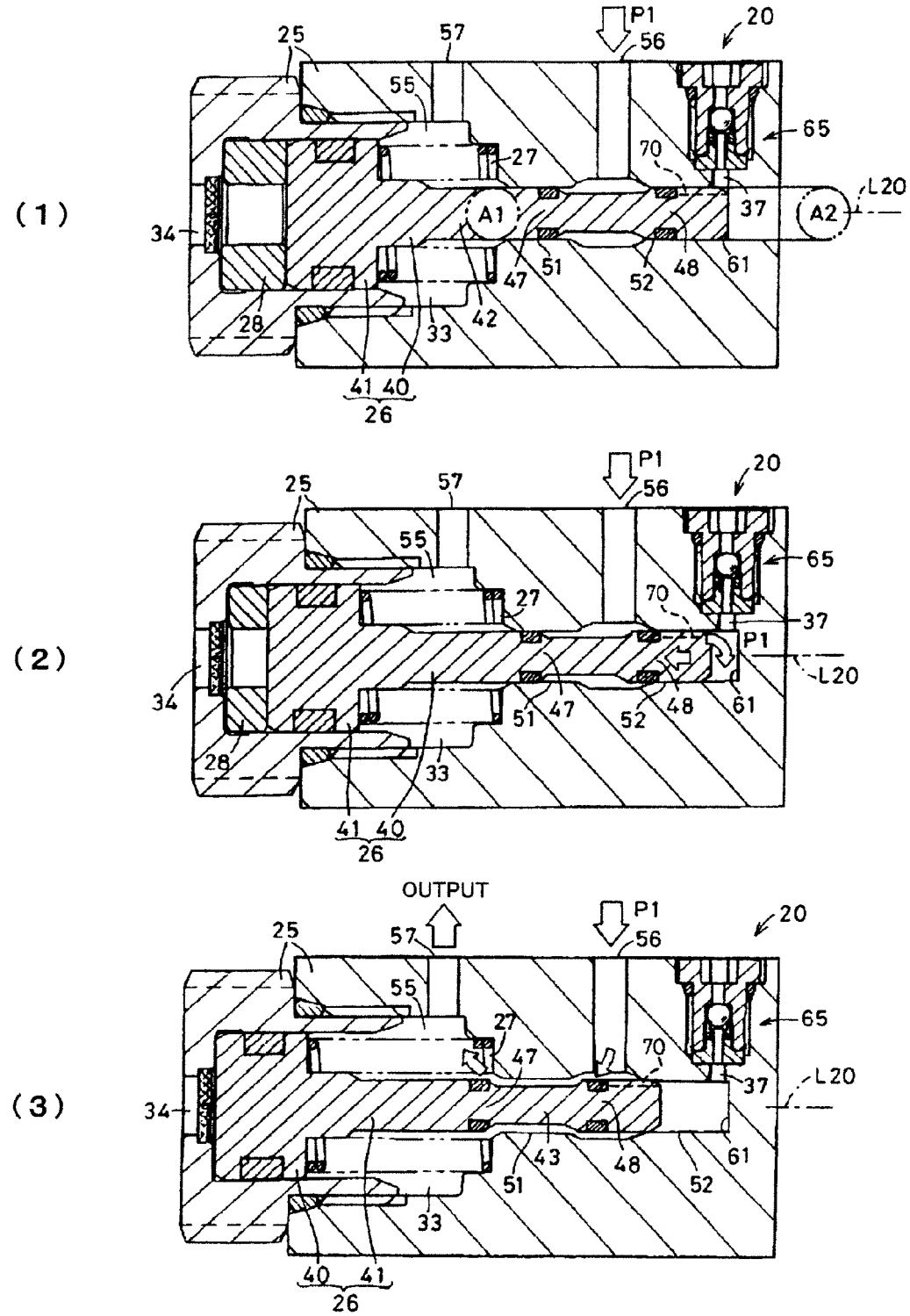
FIG. 3(1) is a cross-sectional view for describing an initial operational state of the relief valve, FIG. 3(2) is a cross-sectional view for describing a fluid driving start position of the valve, and FIG. 3(3) is a cross-sectional view for describing an open position of the valve.

FIG. 3 are cross-sectional views for describing the operational state of the relief valve 20. FIG. 3(1) shows the state where the valve body 26 is disposed at the closed position 42. FIG. 3(2) shows the state where the valve body 26 is disposed at the fluid driving start position. FIG. 3(3) shows the state where the valve body 26 is disposed at the open position 43. The components shown in FIG. 2 are referenced to by those reference numerals.

In the initial state where the relief valve 20 is attached to the tank 21, as shown in FIG. 1 and FIG. 3(1), the valve body 26 is disposed at the closed position 42 and prevented from being displaced by the fuse member 28 in the opening direction X. In this state, the valve passage 55 is closed, the primary port 56 and the secondary port 57 are disconnected from each other, and the driving pressure chamber 61 and the primary port 56 are disconnected from each other. Consequently, output of the gas from the tank internal space 22 to the tank external space 23 is stopped.

The valve body 26 faces the primary passage 35 between the first and second opening and closing control portions 47 and 48. The first and second opening and closing control portions 47 and 48 receive a primary pressure P1 which is a pressure of the gas in the tank internal space 22 which is guided through the primary port 56. The pressing force of the primary pressure P1 received by the first opening and closing control portion 47 is a pressing force applied in the opening direction X1 and the pressing force of the primary pressure P1 received by the second opening and closing control portion 48 is a pressing force applied in the closing direction X2.

The first and second opening and closing control portions 47 and 48 have an equal outer diameter. A cross-sectional area A1 of the first opening and closing control portion 47 is equal to a cross-sectional area A2 of the second opening and closing control portion 48. An area where the valve body 26 receives the primary pressure P1 in the opening direction X1 is equal to an area where the valve body 26 receives the primary pressure P1 in the closing direction X2. Thereby, the pressing forces of the primary pressure P1 applied to the valve body 26 in the opening direction X1 and in the closing direction X2 are in balance. As a result, resultant of the pressing forces of the primary pressure P1 received by the valve body 26 becomes 0.

In the relief valve 20 constructed above, in the initial state where the valve body 26 is disposed at the closed position 42, the pressing force which serves as a driving force for displacing the valve body 26 in the opening direction X1 is only the pressing force which is the spring force applied by the spring member 27, and the pressing force applied to the fuse member 28 via the valve body 26 is only the pressing force of the spring member 27. Under normal condition except for emergency condition such as occurrence of a fire, such initial state is maintained.

When the ambient temperature rises due to occurrence of a fire in the vicinity of the tank 21, temperature of the fuse member 28 also rises. When the temperature of the fuse member 28 reaches the melting point or higher, the fuse member 28 is melted. When the fuse member 28 is melted under emergency condition such as occurrence of a fire, the fuse member 28 cannot prevent displacement of the valve body 26. Thus, the melted material of the fuse member 28 is pushed out from the melted material output passage 34 and output, while the valve body 26 is pressed by the pressing force of the spring member 27 and thereby is displaced in the opening direction X1.

At this time, until the valve body 26 is displaced to the fluid driving start position shown in FIG. 3 (2), the resultant of the pressing forces of the primary pressure P1 received by the valve body 26 is 0 as in the initial state. Since the driving pressure chamber 61 is connected to the tank external space 23 through the pressure control passage 37 in which the check valve means 65 is provided and can suck the gas from the tank external space 23, the event that negative pressure is generated in the driving pressure chamber 61 as in the closed space is prevented. Thus, the valve body 26 can be smoothly displaced.

When the valve body 26 is displaced to the fluid driving start position shown in FIG. 3 (2), the primary port 56 and the driving pressure chamber 61 are connected to each other and the portion of the valve body 26 which faces the driving pressure chamber 61 also receives the primary pressure P1. Thus, the resultant of the pressing forces of the primary pressure P1 received by the valve body 26 becomes the pressing force in the opening direction X1. In this state, the valve body 26 is pressed by the pressing force of the primary pressure P1 in addition to the pressing force of the spring member 27. Since the valve body 26 is thus pressed by such large pressing force, the valve body 26 is accelerated and displaced at a higher speed as compared to the case where the valve body 26 is pressed only by the pressing force of the spring member 27.

When the valve body 26 is driven in this manner and displaced to the opening start position, the valve passage 55 is opened and the primary port 55 and the secondary port 56 are connected to each other so that the gas in the tank internal space 22 is output to the tank external space 23. Finally, the valve body 26 is displaced to the open position 43 shown in FIG. 3(3) and the valve passage 55 is opened with the largest possible opening degree. Thus, the gas in the tank internal space 22 is smoothly output to the tank external space 23.

According to the relief valve 20 in this embodiment, under normal condition, in the state where the valve body 26 which is displaceable from the closed position 42 to the open position 43 is disposed at the closed position 42, the valve body 26 is supported by the fuse member 28 and prevented from being displaced in the opening direction X1. And, the valve passage 55 is closed, thereby preventing flow of gas from the primary port 56 to the secondary port 57. Under emergency condition such as occurrence of a fire, if the ambient temperature rises to the melting point of the fuse member 28 or higher, the fuse member 28 is melted and the valve body 26 is pressed by the spring force of the spring member 27 to be displaced in the opening direction X1. Consequently, the valve passage 55 is opened, thereby allowing the flow of fluid from the primary port 56 to the secondary port 57.

In the state where the valve body 26 displaced under emergency condition is disposed at the position closer to the open position 43 including the fluid driving start position between the closed position 42 and the open position 43, the valve body 26 receives the resultant of the pressing forces of the primary pressure P1 of the gas guided through the primary port 56 in the opening direction X1. In the state where the valve body 26 is disposed at the position closer to the closed position 42 than to the fluid driving start position, the resultant of the pressing forces of the primary pressure P1 in the opening direction X1 becomes smaller, as compared to the state where the valve body 26 is disposed closer to the open position 43 including the fluid driving start position. In other words, in the state where the valve body 26 is disposed at the closed position 42, the received pressing force of the primary pressure P1 is small, in this embodiment, 0. When the valve body 26 is displaced from the closed position 42 to the fluid driving start position in the opening direction X1, the received pressing force of the primary pressure P1 becomes larger.

Thus, under normal condition, it is possible to reduce the pressing force applied to the fuse member 28 via the valve body 26, thereby preventing deformation of the fuse member 28. In this embodiment, it is possible to prevent the pressing force of the primary pressure P1 from being applied to the fuse member 28 via the valve body 26 under normal condition. Therefore, the fuse member 28 can be made smaller and hence, the relief valve 20 can be small-sized.

Under emergency condition, when the valve body 26 is pressed by the pressing force of the spring member 27 so as to be displaced to the fluid driving start position, the valve body 26 can be quickly displaced at high speed in the opening direction X1 with large pressing force obtained by adding the pressing force of primary pressure P1 to the pressing force of the spring member 27. Thus, the quick opening operation can be achieved in a short time. Since the pressing force of the primary pressure P1 can be also used to drive the valve body 26, only the pressing force sufficient to displace the valve body 26 to the fluid driving start position is needed in the spring member 27 and thus, the spring member 27 can be small-sized.

As described above, it is possible to realize the compact relief valve 20 capable of minimizing the pressing force applied to the fuse member 28 for preventing the opening operation under normal condition and of achieving the quick opening operation under emergency condition.

Furthermore, as shown in FIG. 2, by dividing the relief valve 20 into blocks and providing at a secondary port 57, a nipple 70 for connecting a pipe to guide the output gas to a predetermined place, the gas can be suitably output from the tank 21 which has a limitation in location.

Figure 4:
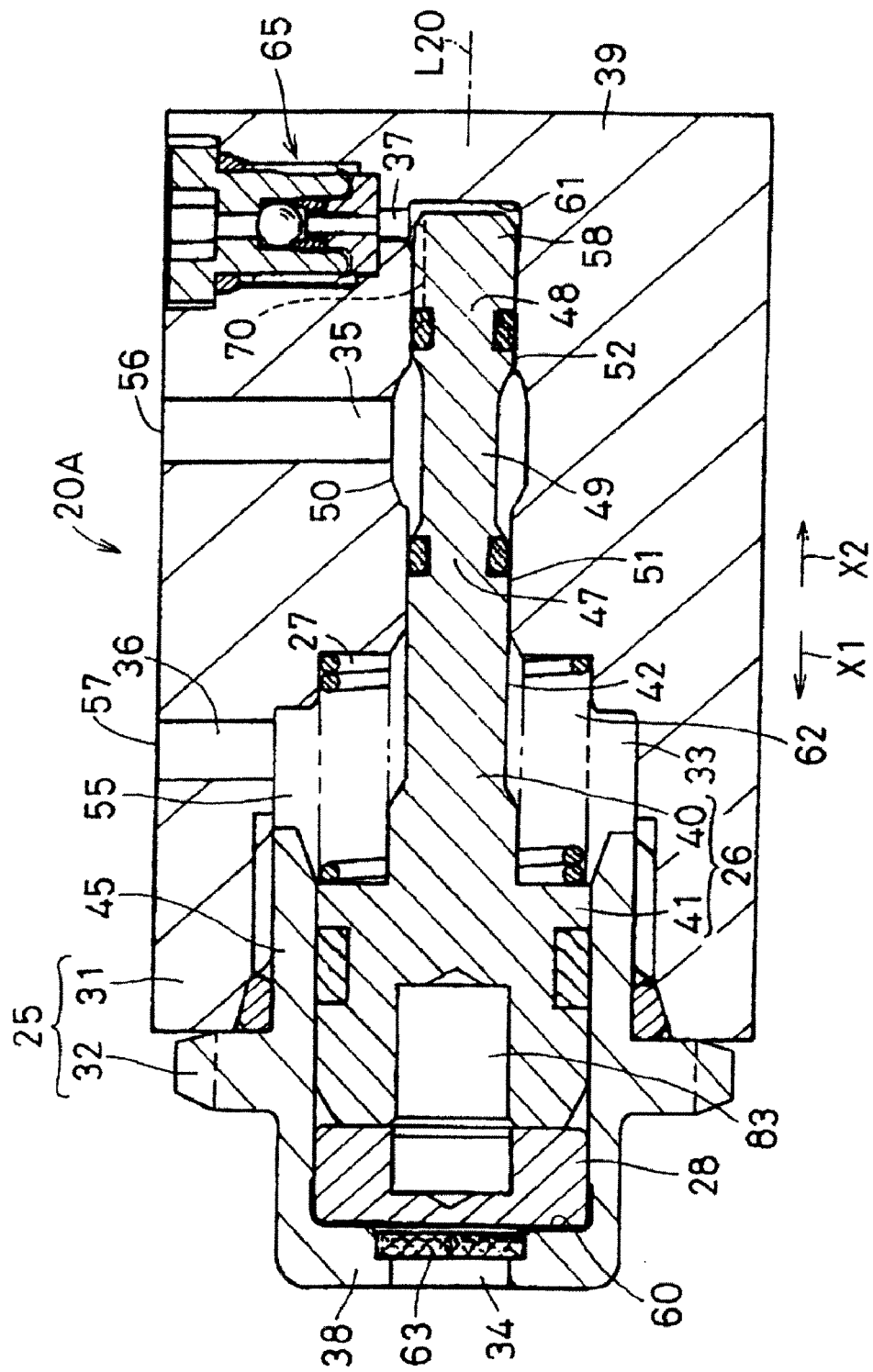
FIG. 4 is a cross-sectional view showing a relief valve according to another embodiment of the present invention.

FIG. 4 is a cross-sectional view showing a relief valve 20A according to another embodiment of the present invention. The relief valve 20A in this embodiment is similar to the relief valve 20 shown in FIG. 1 to FIG. 3. Corresponding elements are identified by the same reference numerals and only different configuration will be described. The relief valve 20A in this embodiment is provided with a recess 83 formed on the piston 41 of the valve body 26 to open in the first axial direction X1, specifically, open so as to face the fuse member chamber 60. With such configuration, the melted material generated by melting the fuse member 28 can be flowed into the recess 83, thereby facilitating displacement of the valve body 26. In this case, even when a fuse member having no through hole which faces the melted material output passage 34 is used as the fuse member 28, the valve body 26 can be smoothly displaced. The relief valve 20A can achieve other effects obtained by using the relief valve 20.

Figure 5:
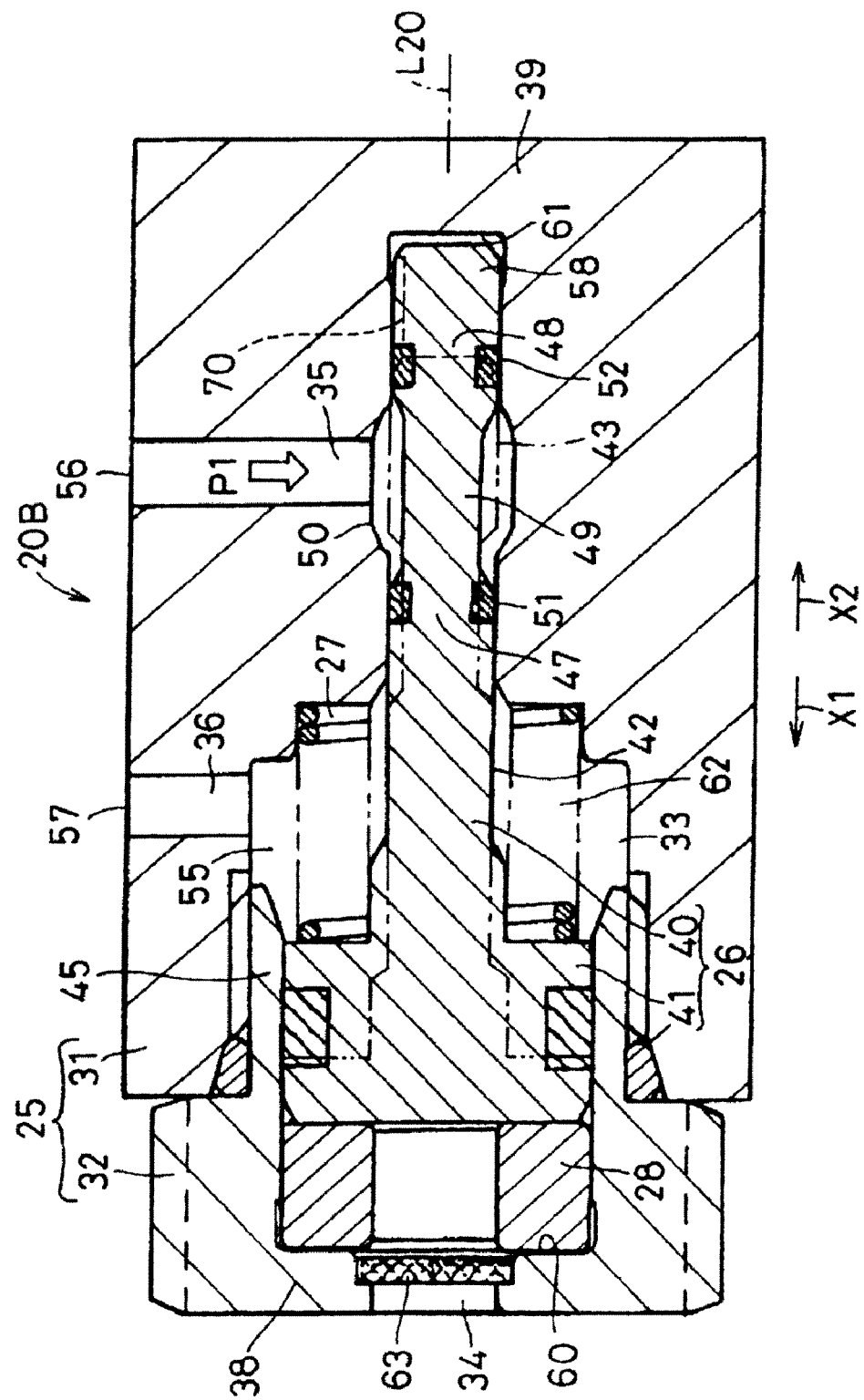
FIG. 5 is a cross-sectional view showing a relief valve according to still another embodiment of the present invention.
Figure 6:
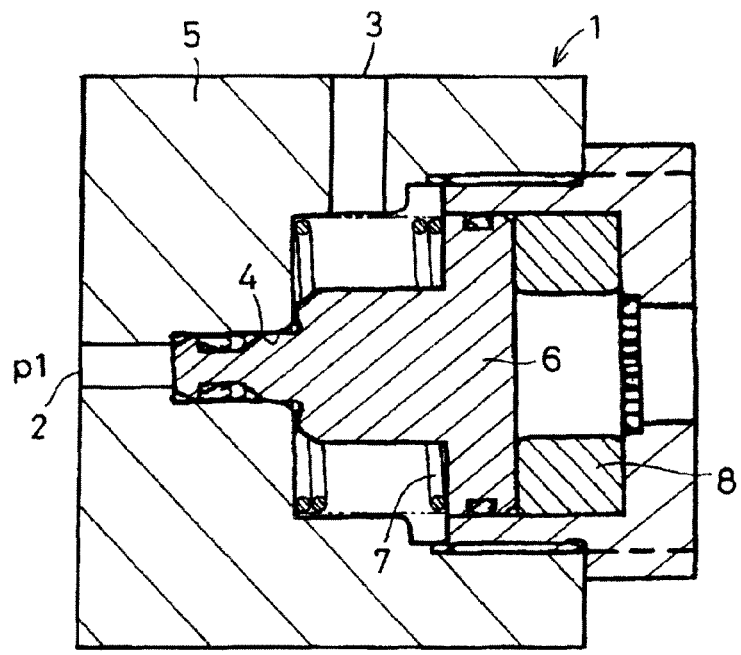
FIG. 6(1) is a cross-sectional view showing a relief valve according to a prior art under a normal condition, while FIG. 6(2) shows the relief valve under an emergency condition.
Figure 6:
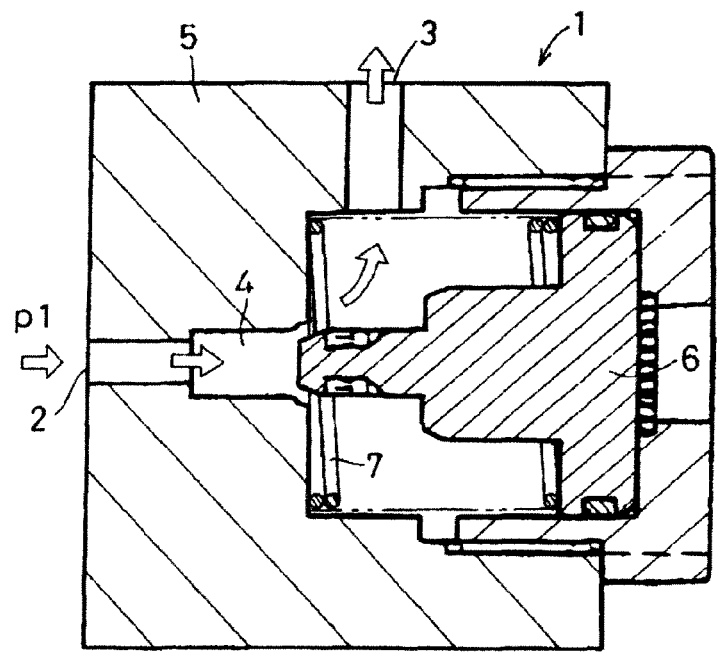
Figure 7:
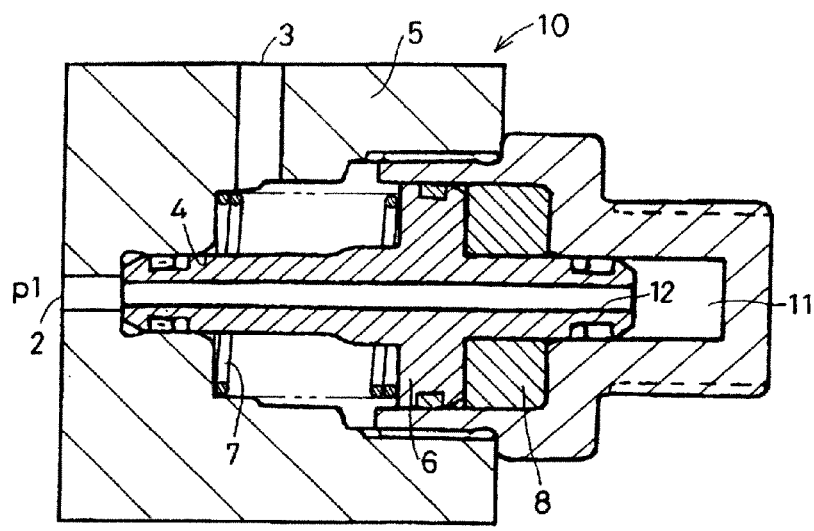
FIG. 7(1) is a cross-sectional view showing a relief valve according to another prior art and showing a condition in which the pressing force to the fuse metal by the primary pressure is cancelled, while FIG. 7(2) shows the same valve under an emergency condition.
Figure 7:
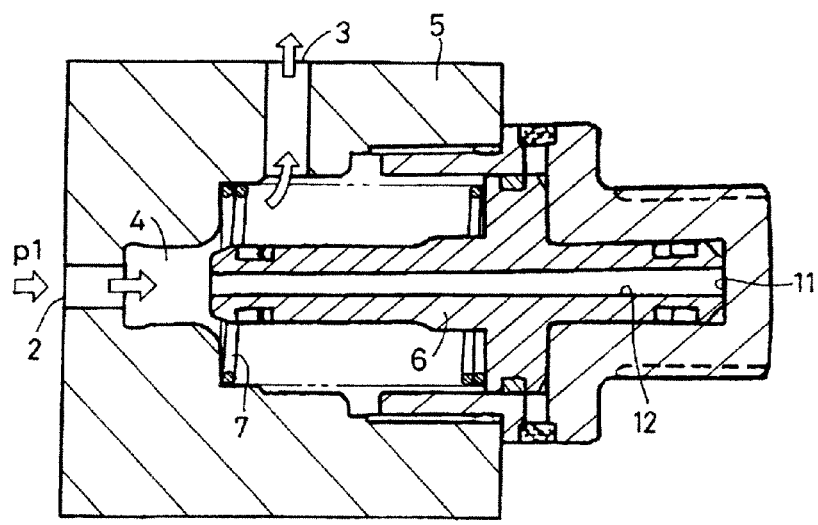

FIG. 5 is a cross-sectional view showing a relief valve 20B according to still another embodiment of the present invention. The relief valve 20B is similar to the relief valve 20 shown in FIG. 1 to FIG. 3. Corresponding elements are identified by the same reference numerals and only different configuration will be described. The relief valve 20B in this embodiment is not provided with the pressure control passage 37 and the check valve 65 which are provided in the relief valve 20 in FIG. 1 to FIG. 3. Even with such configuration, if displacement distance of the valve body 26 from the closed position to the fluid driving start position is set small, the relief valve 20B can perform the operations and achieve effects without negatively affecting the displacement operation of the valve body 26, as in the relief valve 20 in FIGS. 1 to 3.

The above-mentioned embodiments are merely examples of the present invention and configuration may be modified within the scope of the present invention. For example, the first and second opening and closing control portions 47 and 48 may be configured to have different outer diameters, and the resultant of the pressing forces of the primary pressure P1 under normal condition may be applied either in the opening direction X1 or the closing direction X2.

INDUSTRIAL APPLICABILITY

The relief valve device according to the present invention can be used for pressure equipment such as high-pressure gas apparatuses using a compact relief valve device capable of suppressing the pressing force applied to the displacement preventing means for preventing the opening operation under normal condition and of achieving the quick opening operation under emergency condition.

The invention claimed is:

1. A relief valve device comprising:
   a housing provided with a valve passage through which a primary port and a secondary port are connected to each other;
   a valve body which is disposed at a closed position where the valve passage is closed and is displaceable in an opening direction toward an open position where the valve passage is opened, the valve body being provided so as to receive resultant of pressing forces of a primary pressure of fluid guided through the primary port in the opening direction in a state where the valve body is disposed at a position closer to the open position including a fluid driving start position between the closed position and the open position, and so as to receive smaller resultant of the pressing forces of the primary pressure in the opening direction in a state where the valve body is disposed at a position closer to the closed position than to the fluid driving start position than the resultant of the pressing forces received by the valve body in the state where the valve body is disposed at the position closer to the open position including the fluid driving start position;
   a pressing means for pressing the valve body in the opening direction; and a displacement preventing means which is made of a material melted when its temperature reaches a predetermined melting point or higher, the displacement preventing means being provided in a space opened to an outside space and supporting the valve body disposed at the closed position to prevent displacement of the valve body in the opening direction.

2. The relief valve device according to claim 1, wherein in the state where the valve body is disposed at the position closer to the closed position than to the fluid driving start position, the resultant of the pressing forces of the primary pressure received by the valve body becomes zero.

3. The relief valve device according to claim 1 or 2, wherein a pressure chamber is formed by the valve body and the housing such that the pressure chamber is disconnected from the primary port in the state where the valve body is disposed at the position closer to the open position including the fluid driving start position, and is connected to the primary port in the state where the valve body is disposed at the position closer to the closed position than to the fluid driving start position, the valve body receives a pressing force in the opening direction from fluid in the pressure chamber, the housing is provided with a pressure control passage through which the pressure chamber is connected to the outside space, and a check valve means is provided in the pressure control passage, for allowing flow of fluid flowing from an outside space toward the pressure chamber and for preventing flow of fluid flowing from the pressure chamber toward the outside space.

* * * * *